United States Patent
Evans, V et al.

(10) Patent No.: US 9,989,757 B1
(45) Date of Patent: Jun. 5, 2018

(54) DEFORMABLE LENS

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US); Joseph Anthony Tate, San Jose, CA (US); Jason Sean Gagne-Keats, Cupertino, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days. days.

(21) Appl. No.: 15/655,173

(22) Filed: Jul. 20, 2017

Related U.S. Application Data

(60) Provisional application No. 62/525,695, filed on Jun. 27, 2017.

(51) Int. Cl.
*G02B 26/08* (2006.01)

(52) U.S. Cl.
CPC .................. *G02B 26/0875* (2013.01)

(58) Field of Classification Search
CPC .............. G02B 26/0841; G02B 26/105; G02B 26/085; G02B 26/0858; G02B 26/0833; G02B 26/101; B81B 3/0083; B81B 3/0086; B81B 2203/04
USPC ......... 359/198.1–199.4, 200.6–200.8, 202.1, 359/221.2, 223.1–225.1, 226.2, 904, 359/290–295, 665–667; 250/204, 559.06, 250/559.29, 230, 234; 347/255–260; 353/39, 98–99; 385/15–18, 22; 398/12, 398/19, 45

See application file for complete search history.

(56) References Cited

U.S. PATENT DOCUMENTS

| | | | | |
|---|---|---|---|---|
| 5,233,459 | A * | 8/1993 | Bozler | G02B 26/02 345/48 |
| 7,265,477 | B2 * | 9/2007 | Wan | H02N 1/006 200/181 |
| 2008/0297880 | A1 * | 12/2008 | Steckl | G02B 26/004 359/291 |
| 2010/0232161 | A1 * | 9/2010 | Aschwanden | G02B 3/14 362/278 |

* cited by examiner

*Primary Examiner* — Jennifer D. Carruth
(74) *Attorney, Agent, or Firm* — Perkins Coie LLP

(57) ABSTRACT

Disclosed here are methods and systems to vary geometry of an optical lens, so that a single lens can assume various geometries, and change from a portrait lens, to a standard lens, to a wide-angle lens, to a fisheye lens, etc. The lens is made out of piecewise linear elements of polygonal shape, that can move in relation to forcing members laid out on a plane. The forcing members can exert a force on the corresponding piecewise linear elements to cause them to move in relation to the forcing members. The force can be electrical, magnetic, mechanical, etc. As a result, the optical lens can assume various shapes such as concave, convex, and planar.

18 Claims, 10 Drawing Sheets

DEFORMABLE LENS

CROSS-REFERENCE TO RELATED APPLICATIONS

This application claims priority to the U.S. provisional patent application Ser. No. 62/525,695 filed Jun. 27, 2017.

TECHNICAL FIELD

The present application is related to optical lenses, and more specifically to methods and systems that deform optical lenses.

BACKGROUND

Lenses incorporated in cameras today have a fixed geometry, and can be either portrait lenses, standard lenses, wide-angle lenses, etc. Various scenes, however, call for various types of lenses. For example, a photographer taking a portrait picture, would not want to use a wide-angle lens, or a photographer taking a landscape picture would not want to use a portrait lens. As a result, photographers carry various bulky lenses to attach to a camera body. If a wide-angle lenses is mounted on the camera body, and the photographer wants to take a portrait picture, the photographer must remove the wide-angle lens, and mount the portrait lens on the camera body.

SUMMARY

Disclosed here are methods and systems to vary geometry of an optical lens, so that a single lens can assume various geometries, and change from a portrait lens, to a standard lens, to a wide-angle lens, to a fisheye lens, etc. The lens is made out of piecewise linear elements of polygonal shape, that can move in relation to forcing members laid out on a plane. The forcing members can exert a force on the corresponding piecewise linear elements to cause them to move in relation to the forcing members. The force can be electrical, magnetic, mechanical, etc. As a result, the optical lens can assume various shapes such as concave, convex, and planar.

DETAILED DESCRIPTION

Deformable Lens

Disclosed here are methods and systems to vary geometry of an optical lens, so that a single lens can assume various geometries, and change from a portrait lens, to a standard lens, to a wide-angle lens, to a fisheye lens, etc. The lens is made out of piecewise linear elements of polygonal shape, that can move in relation to forcing members laid out on a plane. The forcing members can exert a force on the corresponding piecewise linear elements to cause them to move in relation to the forcing members. The force can be electrical, magnetic, mechanical, etc. As a result, the optical lens can assume various shapes such as concave, convex, and planar.

Figure 1A:
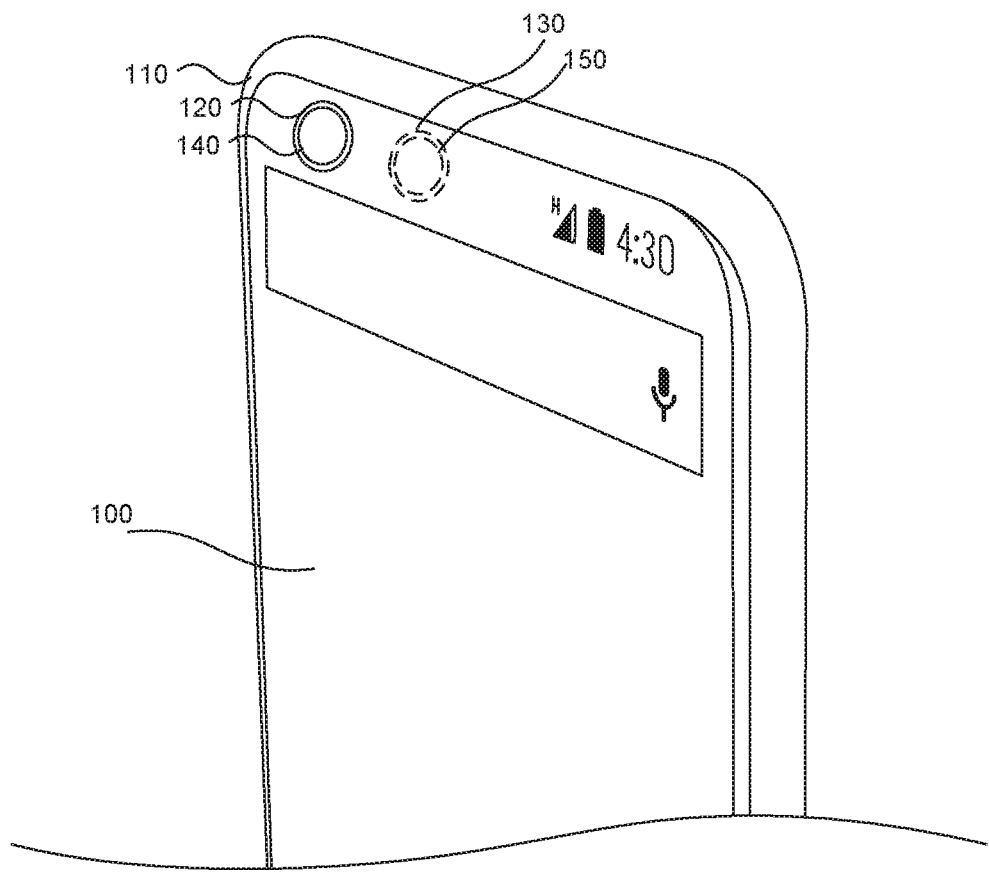
FIG. 1A shows a mobile device with a front and back facing cameras having standard lenses.

FIG. 1A shows a mobile device with a front and back facing cameras having standard lenses. Standard lens can be a normal lens. The mobile device 110 includes the display 100, a front facing camera 120 and a back facing camera 130. The display 100 can partially cover or fully cover a side of the mobile device 110, or can fully cover the whole mobile device 110. The front and back facing cameras 120, 130 have a deformable lens 140, 150, respectively. The lenses 140, 150 can assume various shapes such as a standard lens as shown in FIG. 1A, a wide-angle lens such as a fisheye lens, a concave lens, etc. In one embodiment, only the front camera 120, or only the back camera 130 can have a deformable lens, while in another embodiment, both the front camera 120 and the back camera 130 can both have deformable lenses 140, 150.

Figure 1B:
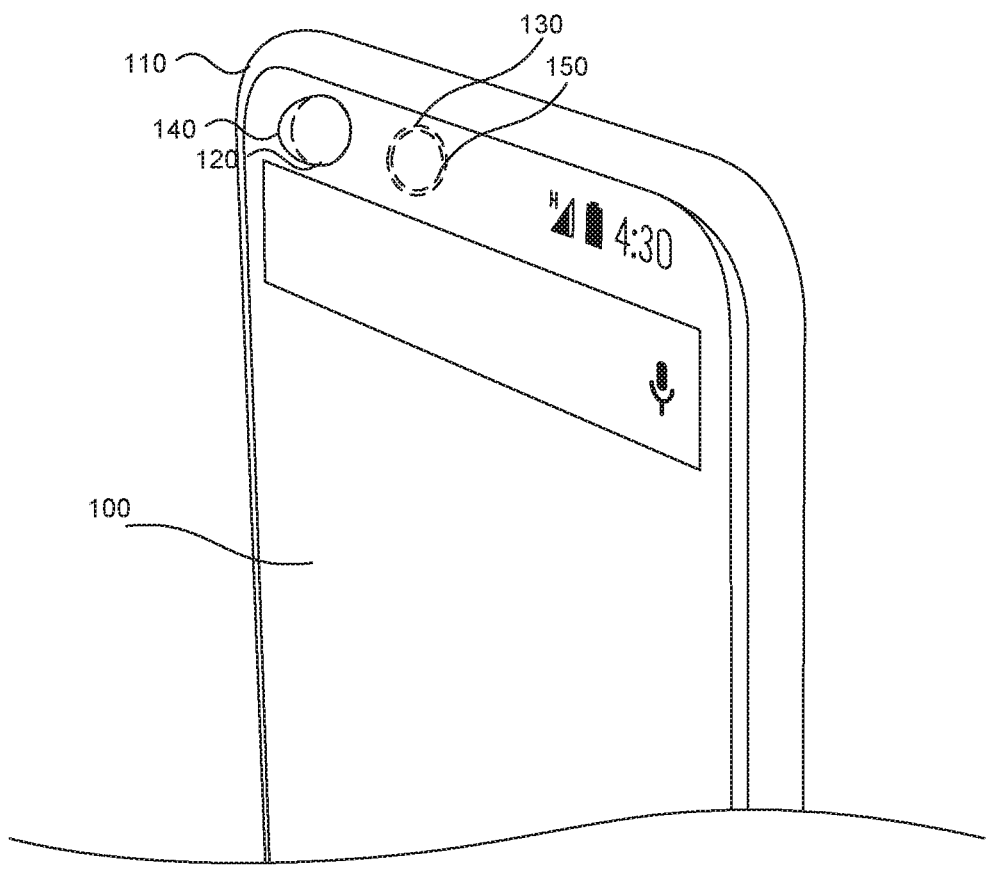
FIG. 1B shows the mobile device with the front camera having a wide-angle lens and the back camera having a standard lens.

FIG. 1B shows the mobile device with the front camera having a wide-angle lens and the back camera having a standard lens. The deformable lens 140 of the front camera 120 can deform to assume a wide-angle lens shape as shown in FIG. 1B. The wide-angle lens shape can be a fish eye lens shape. Similarly, the deformable lens 150 of the back camera 130 can deform to assume a wide-angle lens shape (not shown in FIG. 1B). If both the front and the back lens 140, 150 are deformable, the front and the back lens 140, 150 can deform synchronously, or can deform independently of each other.

Figure 2:
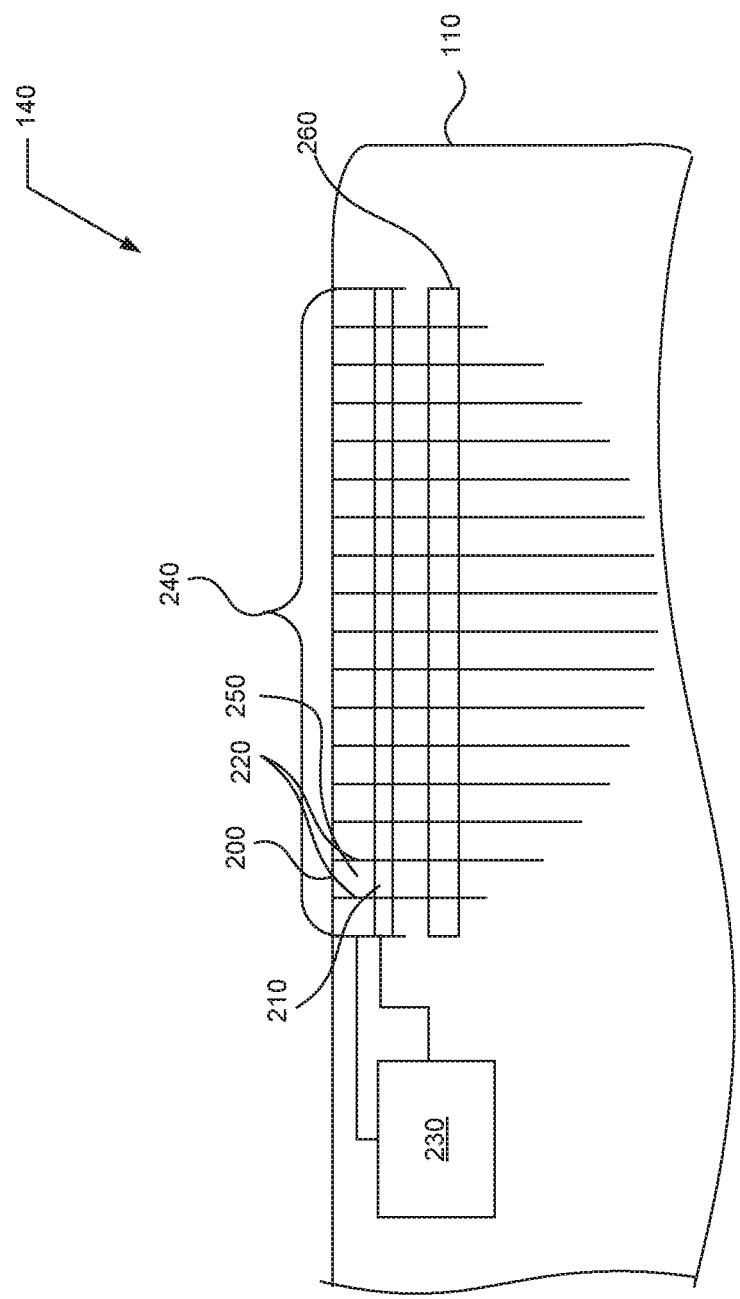
FIG. 2 shows the internal structure of the deformable lens.

FIG. 2 shows the internal structure of the deformable lens. The deformable lens 140 contained within the mobile device 110 includes multiple light focusing members 200 (only one labeled for brevity), multiple forcing members 210 (only one labeled for brevity), multiple insulating members 220 (only one labeled for brevity), a controller 230, and an image sensor 260 to record the light focused through the deformable lens 140.

Multiple light focusing members 200 define a surface 240 of the deformable lens 140. As explained in this application, the deformable lens 140 can assume a shape of a first lens and a second lens. The first lens can be a standard lens is shown in FIG. 2, and the second lens can be a wide-angle lenses shown in FIG. 1B. The second lens can require an exertion of a force to maintain. Further, multiple light focusing members 200 can assume additional positions defining a surface of a concave lens, a convex lens, etc. Multiple light focusing members 200 can include micro lenses having a size no greater than 0.1 $mm^2$. The micro lenses can be micro electromechanical devices. The light focusing member 200 can take on various polygonal shapes such as triangular, square, hexagonal, etc.

Multiple forcing members 210 can be in an active mode and an passive mode. When a forcing member 210 is in the active mode the forcing member can exert the force on the light focusing member 200 causing the light focusing member 200 to assume the second position. The forcing members 210 can exert various forces on the light focusing member 200 such as an electrical force, a magnetic force, a mechanical force, etc.

The insulating member 220, the light focusing member 200, and the forcing member 200 define a prism 250 where the force can be exerted on the light focusing member 200. The insulating member 220 can be made out of various insulating materials depending on the type of force exerted by the forcing member 210. When the forcing member 210 exerts electrical force, the insulating member 220 can made out of electrically insulating materials such as PVC, glass, asbestos, rigid laminate, varnish, resin, paper, Teflon, rubber, etc. When the forcing member 210 exerts magnetic force, the insulating member 220 can be made out of a magnetic insulator such as any ferromagnetic metal, e.g. iron, nickel, cobalt, MuMetal, yttrium iron garnet (YIG), etc. When the forcing member 210 exerts a mechanical force, the insulating member 220 can be made out of material which is nonporous to the fluid, such as rubber, glass, rigid laminate, etc.

The controller 230 sends a control signal to put the forcing member 210 in the active mode, and to put the forcing member in the passive mode. The controller 230 can activate multiple forcing members 210 simultaneously, or sequentially. If the controller 230 is activating multiple forcing members 210 sequentially, the controller can activate multiple forcing members 210 from left to right, right to left, from the center towards the edges, etc. The controller 230 can specify within the control signal to the forcing member 210 a strength of the force to exert on the light focusing member 200.

Figure 3B:
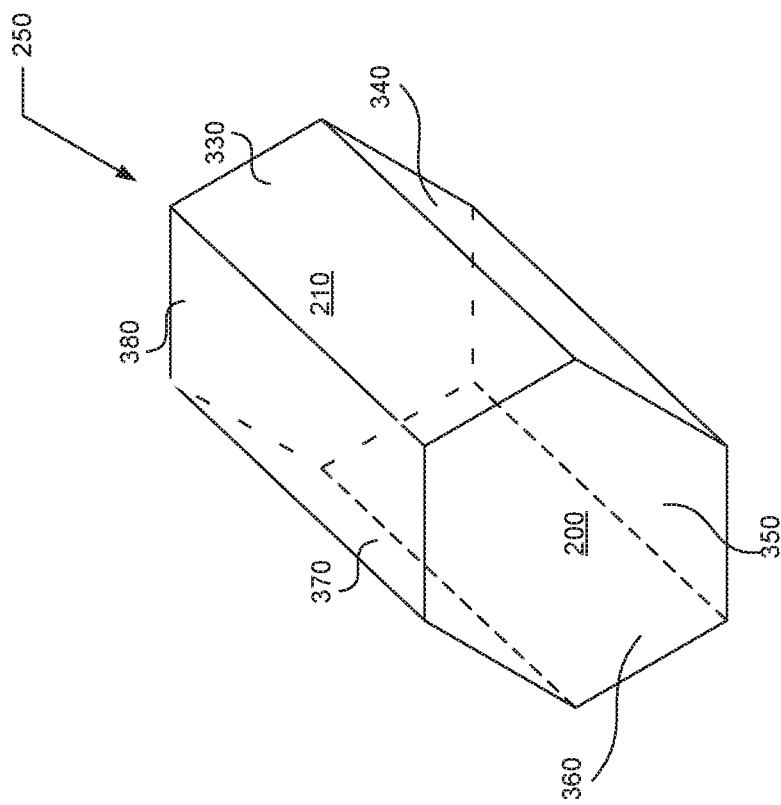
FIGS. 3A-3B show various shapes of the prism 250.
Figure 3A:
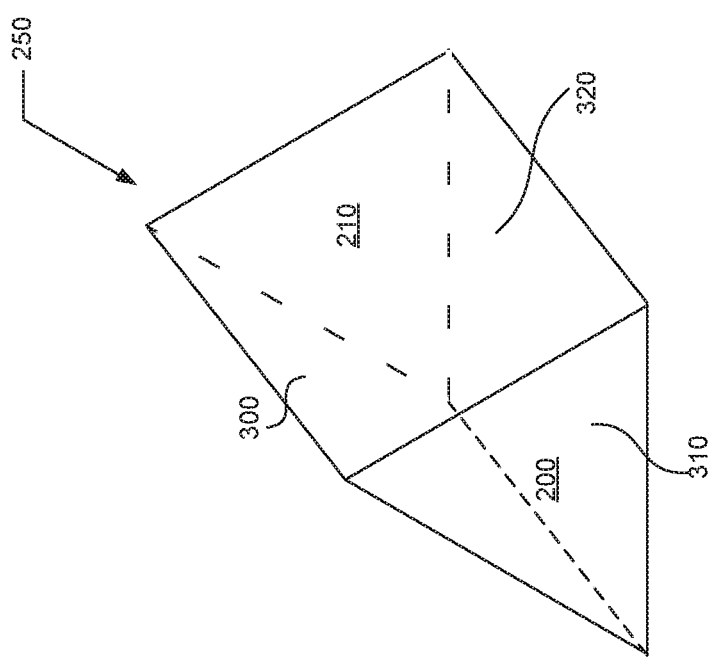

FIGS. 3A-3B show various shapes of the prism 250. Depending on the shape of the light focusing member 200, the shape of the prism 250 defined by the light focusing member 200, the forcing member 210, and the insulating member 220 can vary. Light focusing member 200 in FIG. 3A is shaped like a triangle, while the light focusing member 200 in FIG. 3B is shaped like a hexagon. The forcing member 210 takes on the shape identical, substantially similar, to the light focusing member 200, a triangle in FIG. 3A, and a hexagon in FIG. 3B. The insulating member 220 in FIG. 3A includes the 3 sides 300, 310, 320 defining the triangular prism 250. The insulating member 220 in FIG. 3B includes the six sides 330, 340, 350, 360, 370, 380 defining the hexagonal prism 250. Two neighboring insulating members 220 can share a side 300-380, so that a single side 300-380 defining the prism 250 can define two neighboring prisms.

Figure 4A:
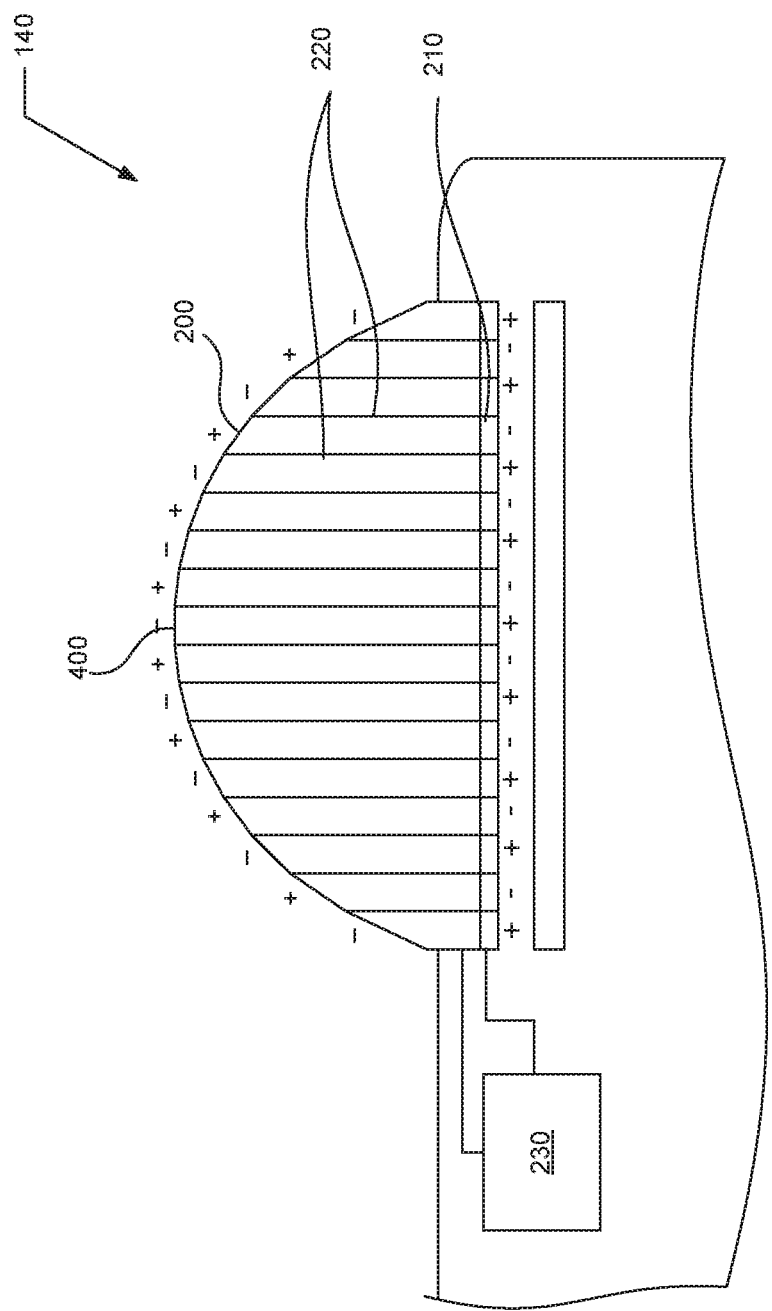
FIGS. 4A-4C show the deformable lens in a convex shape.
Figure 4B:
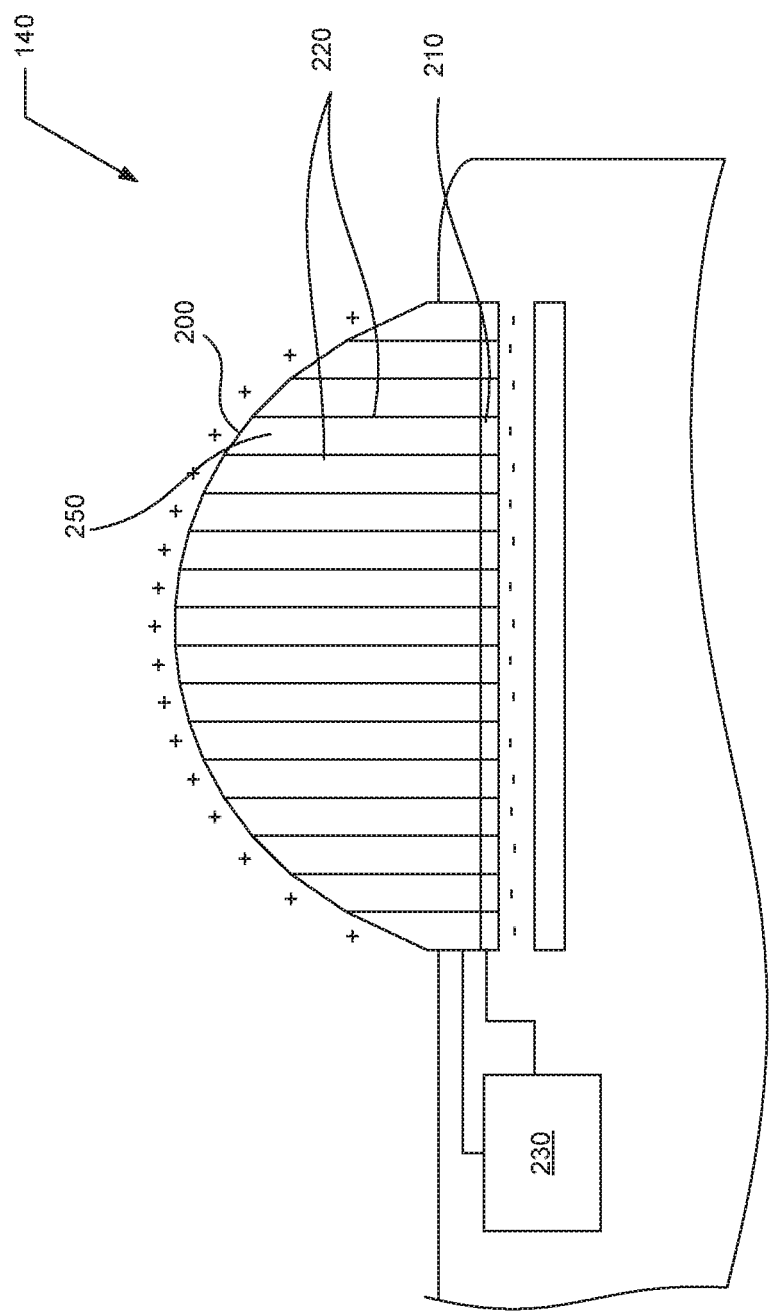
Figure 4C:
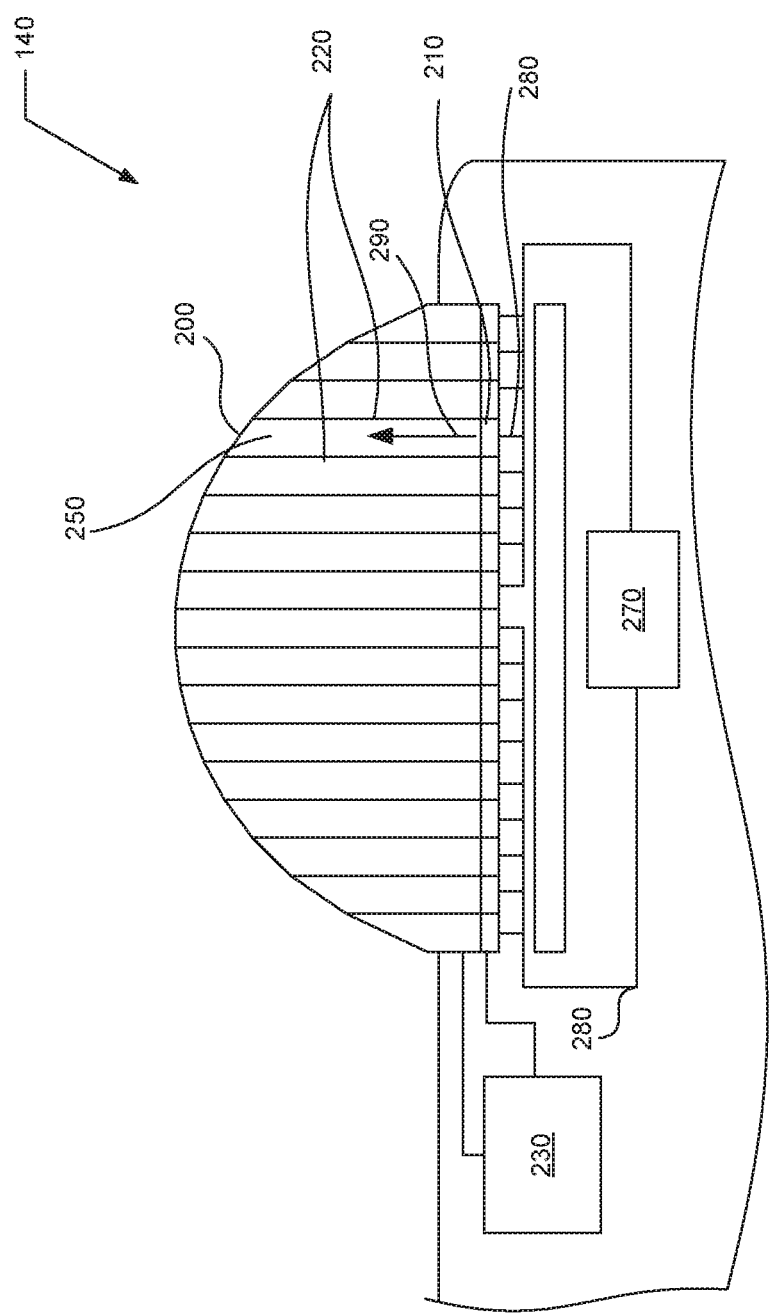

FIGS. 4A-4C show the deformable lens in a convex shape. The deformable lens 140 can take on a convex shape with the application of various forces such as electric force, magnetic force, mechanical force, etc.

When the force applied is electric force, the light focusing member 200 carries a first electrical charge, such as a positive or a negative charge. The first electrical charge can be permanently present on the light focusing member 200, or the first electrical charge can accumulate in response to an instruction sent by the controller 230 to the light focusing member 200. The insulating member 220 includes an electrically insulating materials such as PVC, glass, asbestos, rigid laminate, varnish, resin, paper, Teflon, rubber, etc. The forcing member 210 can carry a second electrical charge opposite of the first electrical charge. The second electrical charge can be permanently present on the forcing member 210, or the second electrical charge can accumulate in response to an instruction sent by the controller 230 to the forcing member 210. If the first electrical charge is permanently present on the light focusing member 200, the second electrical charge only accumulates in response to an instruction sent by the controller 230. In other words, the second electrical charge is not permanently present on the forcing member 210. Similarly, if the second electrical charge is permanently present on the forcing member 210, the first electrical charge only accumulates in response to an instruction sent by the controller 230. The forcing member 210 can be a capacitor which carries the charge when a voltage is applied to the capacitor.

When the force applied is electric force, the controller 230 can cause the first electrical charge to accumulate on the light focusing member by specifying the type and amount of the first electrical charge carried on the light focusing member. The controller can cause the second electrical charge to accumulate on the forcing member by specifying a type and an amount of the second electrical charge carried by the forcing member. The type specified can be positive or negative, and the amount of the charge can be expressed in Coulombs. As shown in FIG. 4A, the charge on neighboring light focusing members 200 and neighboring forcing members 210 can alternate from positive to negative. As shown in FIG. 4B, the charge on all the light focusing members 200 can be the same, when the charge on forcing members 210 is the same, and opposite of the charge on the light focusing members 200.

When the force applied is electric force, if a single type of charge is always applied to the same lights focusing member 200 or the forcing member 210, the accumulation of that charge type can occur even if no voltage is applied to the element. Consequently, the light focusing member 200 and its corresponding forcing member 210 would repel even in a neutral state, and the deformable lens 140 would not be able to achieve a neutral position, such as standard lens position. To avoid the accumulation of a single type of charge on the light focusing member 200 and the forcing member 210, the controller can alternate the type of the electrical charge accumulating on the light focusing member 200 and the forcing member 210 between different electrical charge accumulations. For example, the first time the deformable lens 140 assumes the convex shape, light focusing member 200 has a positive charge, while the corresponding forcing member 210 has a negative charge. The second time the deformable lens 140 assumes the convex shape, the light focusing member 200 has a negative charge, while the corresponding forcing member 210 has a positive charge. The frequency of charge reversal can be after a single charge (as described in the previous sentence), two charges, three charges, up until 100 charges etc.

When the force applied is a magnetic force, the light focusing member 200 includes a first magnetic pole, such as North or South magnetic pole. The insulating member 220 includes a magnetic insulator such as yttrium iron garnet (YIG). The forcing member 210 includes a second magnetic pole, opposite the first magnetic pole, when the forcing member is in the active mode. For example, the forcing member 210 can be a solenoid, that creates a magnetic pole when a current is applied through the solenoid. The neighboring light focusing members 200 can have the same magnetic pole, or opposite magnetic poles, as shown in FIG. 4B. Neighboring light focusing members 200 share an edge.

When the force applied is a mechanical force, the forcing member 210 includes a micro-pump. The micro-pump, when activated, pumps fluid into the prism 250 and causes the light focusing member to move in relation to the forcing member 210, thus causing the deformable lens 140 to assume the convex shape. Fluid can be a gas, such as air, or liquid, such as water. The insulating member 220, the light focusing member 200, and the forcing member 210 prevent the fluid from escaping outside of the prism 250. Fluid pumped into the prism 250 can be contained in a fluid container 270, which provides the fluid, as needed, through fluid ducts 280, to each of the prisms. Once the fluid enters the prism 250 through the fluid duct 280, the fluid moves in the direction 290 to cause the deformable lens 140 to assume convex shape. The fluid container and 270 can contain multiple compartments, where each compartment corresponds to a single prism 250. Each compartment contains the maximum amount of fluid that can fill the single prism 250.

Figure 5:
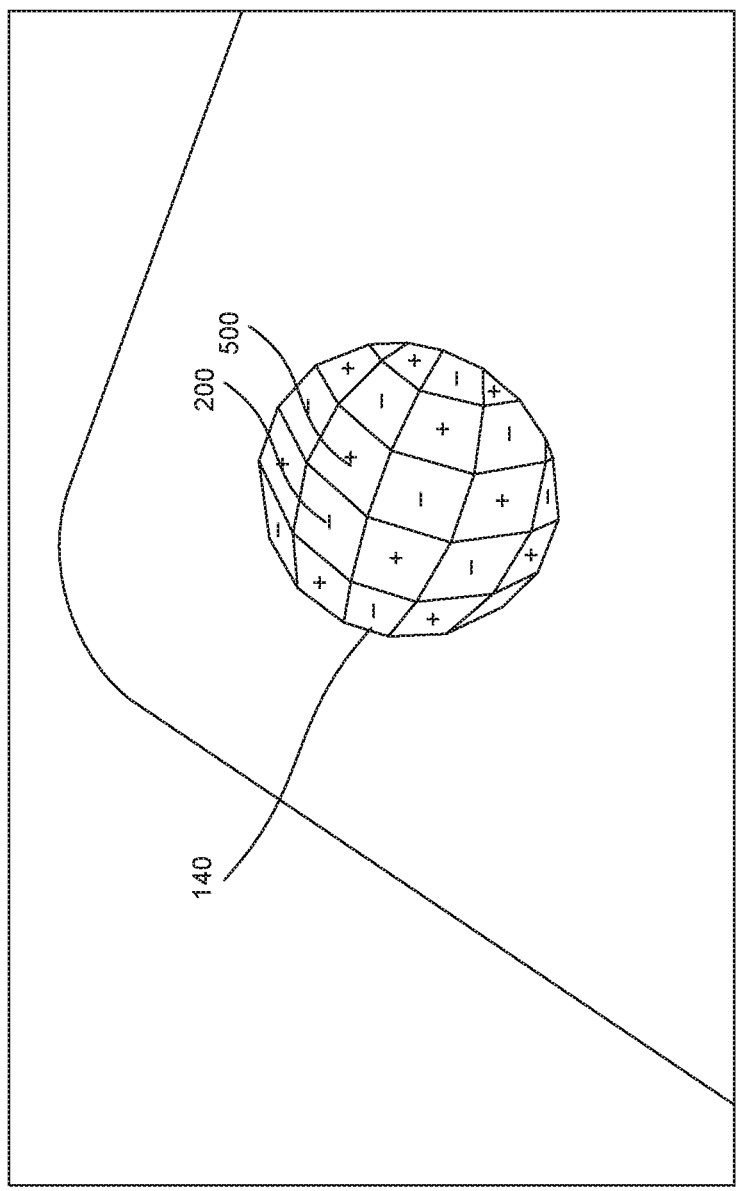
FIG. 5 shows a three-quarter view of the deformable lens in a convex shape.

FIG. 5 shows a three-quarter view of the deformable lens in a convex shape. The light focusing members 200 are piecewise linear polygons, and can assume various shapes such as a quadrilateral as shown in FIG. 5, a triangle, a hexagon, a mix of different polygonal shapes such as a mix of hexagons and pentagons, etc. The light focusing members 200 can be made out of optically transparent refractive materials, such as glass, plastic, transparent metals etc. The material can stretch between a neutral pose such as the pose the light focusing member 200 assumes in FIG. 2, and a convex pose such as pose the light focusing member 200 assumes in FIG. 4A. Neighboring light focusing members 200, 500 can have opposite electrical charges, or opposite magnetic poles as shown in FIG. 5, or they can have identical electrical charges, or identical magnetic poles.

Figure 6:
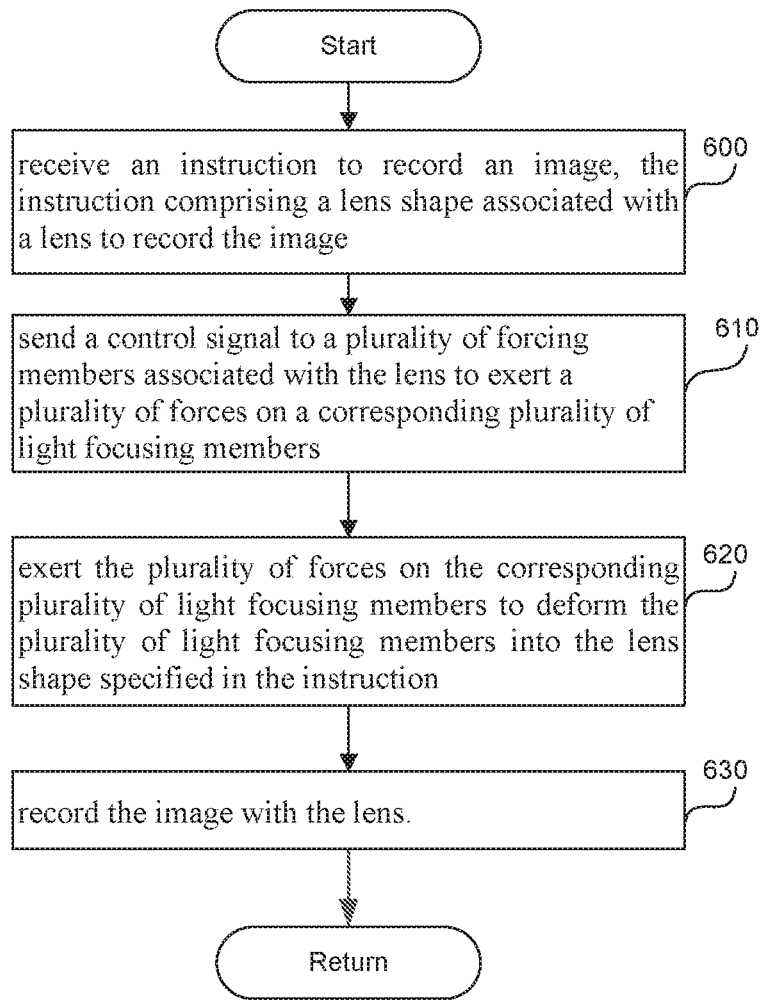
FIG. 6 is a flowchart of a method to record an image using a deformable lens.

FIG. 6 is a flowchart of a method to record an image using a deformable lens. In step 600, the controller 230 in FIG. 2 receives an instruction to record an image. The instruction includes a lens shape of a lens to record the image. The lens shape can be specified as the shape of the lens such as "standard lens", "concave lens", "convex lens", "wide-angle lens", "fisheye lens", etc. Also, the lens shape can be specified as an amount of force to apply to each light focusing member 200 in FIG. 2. The shape of the lens can be specified by the user, or the shape of the lens can be automatically specified. For example, if a processor associated with the device 110 in FIG. 1A determines that the picture is a portrait picture, the lens can assume the shape of a portrait lens, or if the processor determines that the picture is a landscape picture, the lens can assume a wide angle shape.

In step 610, based on the lens shape, the controller 230 sends a control signal to multiple forcing members 210 in FIG. 2 to exert multiple forces on multiple light focusing members 200 in FIG. 2. The control signal can include the amount of force to apply to each light focusing member 200 in FIG. 2.

In step 620, each forcing member 210 in FIG. 2 exerts a force on a corresponding light focusing member 200 causing the light focusing member 200 to move with respect to the forcing member 210. Consequently, multiple light focusing members 200 deform into the lens shape specified in the instruction. In step 630, image sensor 260 records the image with the deformed lens.

When exerting multiple forces, each force in multiple forces is confined to a prism 250 defined by a forcing member 210, a corresponding light focusing member 200, and an insulating member 220. When the shape of the lens is specified as "convex lens", the strength of a force exerted on a center micro lens 400 in FIG. 4A, is at least as high as a strength of a force exerted on other micro lenses.

In one example, to exert the force, the light focusing member 200 accumulates a first electrical charge, while the corresponding forcing member 210 accumulates a second electrical charge opposite the first electrical charge, thereby creating a first force among multiple forces causing the light focusing member 200 to move in relation to the forcing member 210. The prism 250 defined by the light focusing member 200, the forcing member 210, and an insulating member 220, insulates the first force from other forces. The controller 230 can alternate a type of first electrical charge and the type of second electrical charge between different electrical charge accumulations. That way, the controller 230 can prevent a single type of charge accumulating on the light focusing member 200, and/or the forcing member 210. The frequency of alternating the type of charge can be after each electrical charge accumulation, after 2 electrical charge accumulations, 3 electrical charge accumulations, etc., up until 100 electrical charge accumulations.

In another example, to exert the force, the light focusing member 200 carries a first magnetic pole, while the forcing member 210 can carry a second magnetic pole opposite the first magnetic pole of the light focusing member 200. When the forcing member 210 is carrying the second magnetic pole, the opposite magnetic poles create a first force causing the light focusing member to move in relation to the forcing member. The prism 250 defined by the light focusing member 200, the forcing member 210, and an insulating member 220, insulates the first force from other forces in multiple forces.

In another example, to exert the force, the forcing member 210 allows a fluid to flow inside the prism 250, thereby creating a first force in multiple forces causing the light focusing member to move in relation to the forcing member. The prism 250 defined by the light focusing member 200, the forcing member 210, and the insulating member 220, insulates the first force from other forces among multiple forces.

Computer

Figure 7:
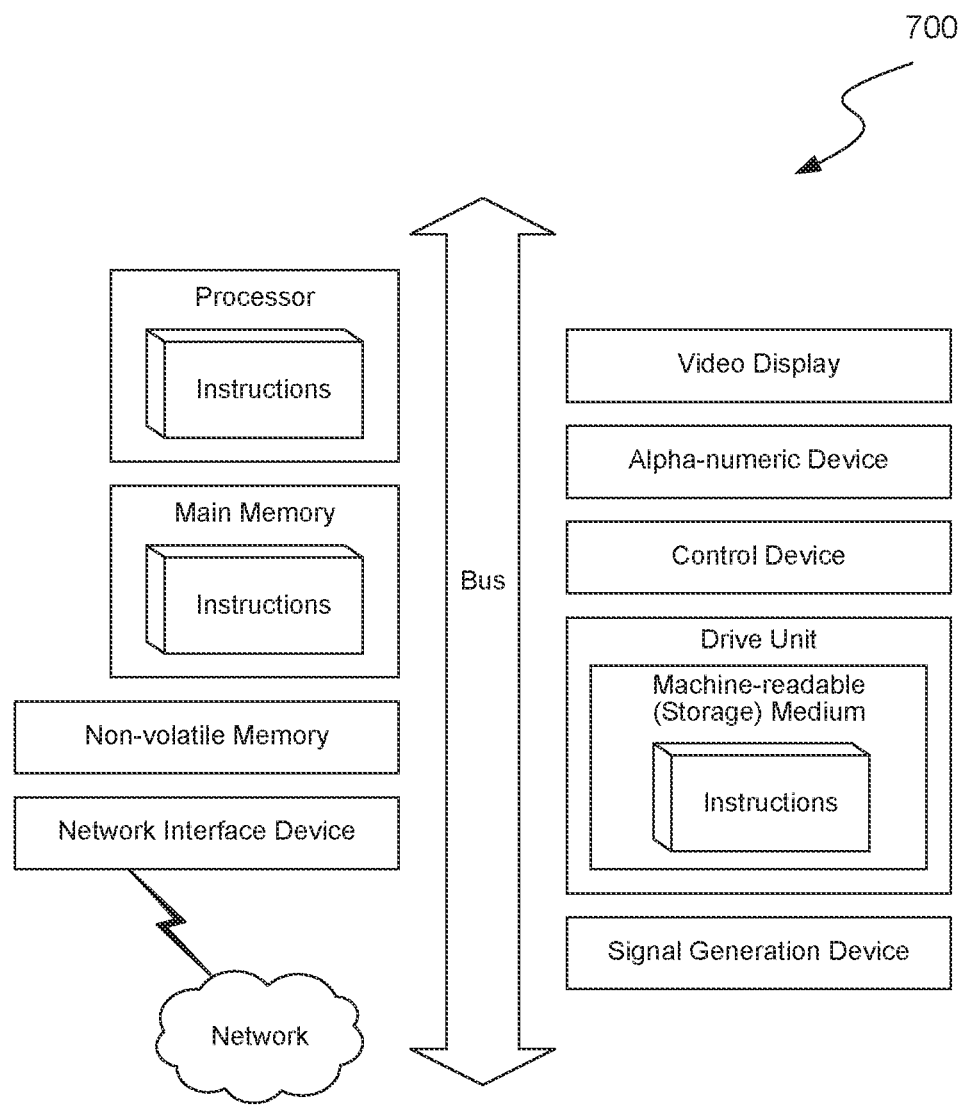
FIG. 7 is a diagrammatic representation of a machine in the example form of a computer system within which a set of instructions, for causing the machine to perform any one or more of the methodologies or modules discussed herein, may be executed.

FIG. 7 is a diagrammatic representation of a machine in the example form of a computer system 700 within which a set of instructions, for causing the machine to perform any one or more of the methodologies or modules discussed herein, may be executed.

In the example of FIG. 7, the computer system 700 includes a processor, memory, non-volatile memory, and an interface device. Various common components (e.g., cache memory) are omitted for illustrative simplicity. The computer system 700 is intended to illustrate a hardware device on which any of the components described in the example of FIGS. 1-18 (and any other components described in this specification) can be implemented. The computer system 700 can be of any applicable known or convenient type. The components of the computer system 700 can be coupled together via a bus or through some other known or convenient device.

The processor in FIG. 7 can be the controller 230 in FIG. 2 in communication with the light focusing members 200, in the forcing elements 210. In addition, the processor in FIG. 7 can be a processor of the device 110 in FIG. 1A, in communication with the controller 230 in FIG. 2. The device 110 can contain the computer system 700 in FIG. 7.

This disclosure contemplates the computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 700. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 7 reside in the interface.

In operation, the computer system 700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, members, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute members involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An apparatus, comprising:
  a plurality of micro electromechanical lenses collectively comprising a deformable lens configurable as any of a standard lens and a wide-angle lens;
  a plurality of micro electromechanical devices, each micro electromechanical device operable in an active mode in which the micro electromechanical device exerts a force on a corresponding micro electromechanical lens among the plurality of micro electromechanical lenses to shape the deformable lens as the wide-angle lens, and each micro electromechanical device operable in a passive mode in which the corresponding micro electromechanical lens among the plurality of micro electromechanical lenses shapes the deformable lens as the standard lens;
  a plurality of insulating members surrounding the plurality of micro electromechanical lenses among the plurality of micro electromechanical devices;
  an insulating member among the plurality of insulating members, a micro electromechanical lens among the plurality of micro electromechanical lenses, and a micro electromechanical device among the plurality of micro electromechanical devices defining a prism in which the force is selectively exerted on the micro electromechanical lens; and
  a controller that selectively operates to put the micro electromechanical device in either of the active mode and the passive mode.

2. An apparatus comprising:
  a plurality of light focusing members defining a surface of a deformable lens configurable as any a first lens and a second lens, the second lens requiring an exertion of a force to maintain;
  a plurality of forcing members, each forcing member among the plurality of forcing members operable in an active mode in which the forcing member exerts the force on a corresponding light focusing member among the plurality of light focusing members to shape the deformable lens as the second lens, and each forcing member operable in a passive mode in which the corresponding light focusing member among the plurality of light focusing members shapes the deformable lens as the first lens;
a plurality of insulating members, surrounding the plurality of light focusing members in the plurality of forcing members;
an insulating member among the plurality of insulating members, a light focusing member among the plurality of light focusing members, and a forcing member among the plurality of forcing members defining a prism where the force is selectively exerted on the light focusing member; and
a controller that selectively operates to put the forcing member in the active mode, and the passive mode.

3. The apparatus of claim 2, the first lens comprising a standard lens, and the second lens comprising a fisheye lens.

4. The apparatus of claim 2, the plurality of light focusing members having a size no greater than 0.1 mm.

5. The apparatus of claim 2, the light focusing member comprising a polygonal shape.

6. The apparatus of claim 2, comprising:
the light focusing member carrying a first electrical charge;
the insulating member comprising an electrical insulator; and
the forcing member carrying a second electrical charge.

7. The apparatus of claim 6, the controller causing the first electrical charge to accumulate on the light focusing member by specifying a type and an amount of the first electrical charge carried on the light focusing member, and the controller causing the second electrical charge to accumulate on the forcing member by specifying a type and an amount of the second electrical charge carried by the forcing member.

8. The apparatus of claim 7, the controller alternating the type of the first electrical charge, and the type of the second electrical charge between different electrical charge accumulations.

9. The apparatus of claim 2, comprising:
the light focusing member comprising a first magnetic pole;
the insulating member comprising a magnetic insulator; and
the forcing member comprising a second magnetic pole when the forcing member is in the active mode.

10. The apparatus of claim 9, neighboring light focusing members among the plurality of light focusing members comprising opposite magnetic poles.

11. The apparatus of claim 2, the forcing member comprising a micro-pump operable in the active mode in which the forcing member allows fluid to flow into the prism and to exert the force on the corresponding light focusing member to shape the deformable lens as the second lens.

12. The apparatus of claim 2, the controller to specify to the forcing member a strength of the force to exert on the light focusing member.

13. The apparatus of claim 2, the plurality of light focusing members to assume at least a first position, a second position, or a third position, the first position defining a surface of a standard lens, the second position defining a surface of a concave lens, and the third position defining a surface of a convex lens.

14. A method comprising:
receiving an instruction to record an image, the instruction comprising a lens shape associated with a lens to record the image;
based on the lens shape, sending a control signal to a plurality of forcing members associated with the lens to exert a plurality of forces on a corresponding plurality of light focusing members;
exerting the plurality of forces on the corresponding plurality of light focusing members to deform the plurality of light focusing members into the lens shape specified in the instruction, said exerting the plurality of forces comprising:
confining each force among the plurality of forces to a prism defined by a forcing member among the plurality of forcing members, a corresponding light focusing member among the plurality of light focusing members, and an insulating member; and
recording the image with the lens.

15. A method comprising:
receiving an instruction to record an image, the instruction comprising a lens shape associated with a lens to record the image;
based on the lens shape, sending a control signal to a plurality of forcing members associated with the lens to exert a plurality of forces on a corresponding plurality of light focusing members;
exerting the plurality of forces on the corresponding plurality of light focusing members to deform the plurality of light focusing members into the lens shape specified in the instruction said exerting the plurality of forces comprising:
accumulating a first electrical charge on a light focusing member among the plurality of light focusing members;
accumulating a second electrical charge opposite the first electrical charge on a forcing member corresponding to the light focusing member, thereby creating a first force among the plurality of forces causing the light focusing member to move in relation to the forcing member;
insulating inside a prism defined by the light focusing member, the forcing member, and an insulating member, the first force from other forces among the plurality of forces; and
recording the image with the lens.

16. The method of claim 15, comprising alternating a type of the first electrical charge, and the type of the second electrical charge between different electrical charge accumulations.

17. A method comprising:
receiving an instruction to record an image, the instruction comprising a lens shape associated with a lens to record the image;
based on the lens shape, sending a control signal to a plurality of forcing members associated with the lens to exert a plurality of forces on a corresponding plurality of light focusing members;
exerting the plurality of forces on the corresponding plurality of light focusing members to deform the plurality of light focusing members into the lens shape specified in the instruction, said exerting the plurality of forces comprising:
carrying a first magnetic pole by a light focusing member among the plurality of light focusing members;
creating a second magnetic pole opposite the first magnetic pole on a forcing member corresponding to the light focusing member, thereby creating a first force causing the light focusing member to move in relation to the forcing member;

insulating inside a prism defined by the light focusing member, the forcing member, and an insulating member, the first force from other forces among the plurality of forces; and recording the image with the lens.

18. A method comprising:

receiving an instruction to record an image, the instruction comprising a lens shape associated with a lens to record the image;

based on the lens shape, sending a control signal to a plurality of forcing members associated with the lens to exert a plurality of forces on a corresponding plurality of light focusing members;

exerting the plurality of forces on the corresponding plurality of light focusing members to deform the plurality of light focusing members into the lens shape specified in the instruction, said exerting the plurality of forces comprising:

defining a prism with a light focusing member among the plurality of light focusing members, a forcing member among the plurality of forcing members, and an insulating member;

allowing a fluid inside the prism, thereby creating a first force among the plurality of forces causing the light focusing member to move in relation to the forcing member; and recording the image with the lens.

* * * * *